United States Patent
Sundstrom

(10) Patent No.: US 9,330,190 B2
(45) Date of Patent: May 3, 2016

(54) METHOD AND SYSTEM FOR PROVIDING DATA HANDLING INFORMATION FOR USE BY A PUBLISH/SUBSCRIBE CLIENT

(75) Inventor: Robert J. Sundstrom, Cary, NC (US)

(73) Assignee: Swift Creek Systems, LLC, Portsmouth, DE (US)

( * ) Notice: Subject to any disclaimer, the term of this patent is extended or adjusted under 35 U.S.C. 154(b) by 2975 days.

(21) Appl. No.: 11/609,065

(22) Filed: Dec. 11, 2006

(65) Prior Publication Data

US 2008/0140709 A1     Jun. 12, 2008

(51) Int. Cl.
*G06F 7/00* (2006.01)
*G06F 17/30* (2006.01)
*H04L 29/08* (2006.01)

(52) U.S. Cl.
CPC ............ *G06F 17/3089* (2013.01); *H04L 67/24* (2013.01)

(58) Field of Classification Search
CPC ......... G06F 7/00; G06F 157/16; G06F 15/16; G06F 9/44; G06F 17/3089
See application file for complete search history.

(56) References Cited

U.S. PATENT DOCUMENTS

| | | |
|---|---|---|
| 4,814,971 A | 3/1989 | Thatte |
| 5,469,453 A | 11/1995 | Glider et al. |
| 5,491,626 A | 2/1996 | Williams et al. |
| 5,717,923 A | 2/1998 | Dedrick |
| 5,734,818 A | 3/1998 | Kern et al. |
| 5,781,911 A | 7/1998 | Young et al. |
| 5,838,682 A | 11/1998 | Dekelbaum et al. |
| 5,893,083 A | 4/1999 | Eshghi et al. |
| 5,960,406 A | 9/1999 | Rasansky |
| 5,963,913 A | 10/1999 | Henneuse et al. |
| 5,976,395 A | 11/1999 | Ha |
| 6,021,426 A | 2/2000 | Douglis et al. |
| 6,029,195 A | 2/2000 | Herz |
| 6,067,477 A | 5/2000 | Wewalaarachchi et al. |
| 6,085,166 A | 7/2000 | Beckhardt et al. |
| 6,148,328 A | 11/2000 | Cuomo et al. |
| 6,202,099 B1 | 3/2001 | Gillies et al. |
| 6,240,451 B1 | 5/2001 | Campbell et al. |
| 6,301,609 B1 | 10/2001 | Aravamudan et al. |

(Continued)

FOREIGN PATENT DOCUMENTS

| | | |
|---|---|---|
| WO | WO 99/09490 | 2/1999 |
| WO | WO 2004/006486 | 1/2004 |

OTHER PUBLICATIONS

JP 2004-240821 (Okuyama) Aug. 26, 2004 (abstract) [online] Retrieved from the PAJ database.

(Continued)

*Primary Examiner* — Azam Cheema

(57) ABSTRACT

A method for providing data handling information for use by a client of a pub/sub service to handle data published by the pub/sub service includes receiving a subscription request to a data tuple that includes source data from a client of the pub/sub service. When the request is received, a first subscription is provided for the client to the data tuple and a second subscription, distinct from the first subscription, is automatically provided for the client to a data handling tuple that is associated with the data tuple and that includes data handling information defining how the source data of the data tuple is to be handled by the client. A first notification message including the source data is generated and a second notification message, distinct from the first notification message, is generated that includes the data handling information.

23 Claims, 5 Drawing Sheets

(56) References Cited

U.S. PATENT DOCUMENTS

| | | | |
|---|---|---|---|
| 6,353,660 B1 | 3/2002 | Burger et al. | |
| 6,363,249 B1 | 3/2002 | Nordeman et al. | |
| 6,400,381 B1 | 6/2002 | Barrett et al. | |
| 6,400,810 B1 | 6/2002 | Skladman et al. | |
| 6,408,370 B2 | 6/2002 | Yamamoto et al. | |
| 6,430,604 B1 | 8/2002 | Ogle et al. | |
| 6,463,501 B1 | 10/2002 | Kern et al. | |
| 6,480,885 B1 | 11/2002 | Olivier | |
| 6,493,755 B1 | 12/2002 | Hansen et al. | |
| 6,549,939 B1 | 4/2003 | Ford et al. | |
| 6,587,836 B1 | 7/2003 | Ahlberg et al. | |
| 6,604,102 B2 | 8/2003 | Klein et al. | |
| 6,606,744 B1 | 8/2003 | Mikurak | |
| 6,643,682 B1 * | 11/2003 | Todd et al. | 709/202 |
| 6,654,790 B2 | 11/2003 | Ogle et al. | |
| 6,668,167 B2 | 12/2003 | McDowell et al. | |
| 6,668,173 B2 | 12/2003 | Greene | |
| 6,675,168 B2 | 1/2004 | Shapiro | |
| 6,681,220 B1 | 1/2004 | Kaplan et al. | |
| 6,697,840 B1 | 2/2004 | Godefroid et al. | |
| 6,724,403 B1 | 4/2004 | Santoro et al. | |
| 6,738,975 B1 | 5/2004 | Yee et al. | |
| 6,751,657 B1 | 6/2004 | Zothner | |
| 6,754,904 B1 | 6/2004 | Cooper et al. | |
| 6,757,722 B2 | 6/2004 | Lonnfors et al. | |
| 6,760,340 B1 | 7/2004 | Banavar et al. | |
| 6,766,362 B1 | 7/2004 | Miyasaka et al. | |
| 6,775,658 B1 | 8/2004 | Zothner | |
| 6,789,228 B1 | 9/2004 | Merril et al. | |
| 6,799,196 B1 | 9/2004 | Smith | |
| 6,839,735 B2 | 1/2005 | Wong et al. | |
| 6,839,737 B1 | 1/2005 | Friskel | |
| 6,853,634 B1 | 2/2005 | Davies et al. | |
| 6,907,011 B1 | 6/2005 | Miller et al. | |
| 6,912,532 B2 | 6/2005 | Anderson | |
| 6,961,765 B2 | 11/2005 | Terry | |
| 6,970,987 B1 | 11/2005 | Ji et al. | |
| 6,980,993 B2 | 12/2005 | Horovitz et al. | |
| 7,028,264 B2 | 4/2006 | Santoro et al. | |
| 7,035,923 B1 | 4/2006 | Yoakum et al. | |
| 7,051,274 B1 | 5/2006 | Cottrille et al. | |
| 7,107,285 B2 | 9/2006 | Von Kaenel et al. | |
| 7,111,044 B2 | 9/2006 | Lee | |
| 7,139,554 B2 | 11/2006 | Litwin | |
| 7,139,797 B1 | 11/2006 | Yoakum et al. | |
| 7,177,859 B2 | 2/2007 | Pather et al. | |
| 7,177,928 B2 | 2/2007 | Sasaki et al. | |
| 7,184,524 B2 | 2/2007 | Digate et al. | |
| 7,219,303 B2 | 5/2007 | Fish | |
| 7,231,596 B2 | 6/2007 | Koren | |
| 7,246,371 B2 | 7/2007 | Diacakis et al. | |
| 7,251,482 B2 | 7/2007 | Ackermann-Markes | |
| 7,263,545 B2 | 8/2007 | Digate et al. | |
| 7,269,162 B1 | 9/2007 | Turner | |
| 7,302,634 B2 | 11/2007 | Lucovsky et al. | |
| 7,334,021 B1 | 2/2008 | Fletcher | |
| 7,412,522 B2 | 8/2008 | Liscano et al. | |
| 7,444,379 B2 | 10/2008 | Becker et al. | |
| 7,606,808 B2 * | 10/2009 | McCann et al. | |
| 7,606,913 B2 | 10/2009 | Shiga et al. | |
| 7,686,215 B2 | 3/2010 | Jones et al. | |
| 7,720,914 B2 * | 5/2010 | Goodman et al. | 709/206 |
| 2001/0025280 A1 | 9/2001 | Mandato et al. | |
| 2001/0027439 A1 | 10/2001 | Holtzman et al. | |
| 2002/0007420 A1 | 1/2002 | Eydelman et al. | |
| 2002/0016839 A1 | 2/2002 | Smith | |
| 2002/0019816 A1 | 2/2002 | Shafrir et al. | |
| 2002/0021307 A1 | 2/2002 | Glenn et al. | |
| 2002/0023132 A1 | 2/2002 | Tornabene et al. | |
| 2002/0026505 A1 | 2/2002 | Terry | |
| 2002/0029173 A1 | 3/2002 | Goldstein | |
| 2002/0055973 A1 | 5/2002 | Low et al. | |
| 2002/0056004 A1 | 5/2002 | Smith | |
| 2002/0087594 A1 | 7/2002 | Peters | |
| 2002/0103743 A1 | 8/2002 | Najimi | |
| 2002/0116461 A1 | 8/2002 | Diacakis et al. | |
| 2002/0120687 A1 | 8/2002 | Diacakis et al. | |
| 2002/0120774 A1 | 8/2002 | Diacakis | |
| 2002/0130904 A1 | 9/2002 | Becker et al. | |
| 2002/0133737 A1 | 9/2002 | Novick | |
| 2002/0138624 A1 | 9/2002 | Esenther et al. | |
| 2002/0152244 A1 | 10/2002 | Dean et al. | |
| 2002/0165724 A1 | 11/2002 | Blankesteijn | |
| 2002/0169644 A1 | 11/2002 | Greene et al. | |
| 2002/0183140 A1 | 12/2002 | Lamb | |
| 2002/0184089 A1 | 12/2002 | Tsou et al. | |
| 2003/0009530 A1 | 1/2003 | Philonenko et al. | |
| 2003/0018726 A1 | 1/2003 | Low et al. | |
| 2003/0018747 A1 | 1/2003 | Herland et al. | |
| 2003/0043190 A1 | 3/2003 | Bernius et al. | |
| 2003/0046421 A1 | 3/2003 | Horvitz et al. | |
| 2003/0055898 A1 | 3/2003 | Yeager et al. | |
| 2003/0055983 A1 | 3/2003 | Callegari | |
| 2003/0058277 A1 | 3/2003 | Bowman-Amuah | |
| 2003/0065788 A1 | 4/2003 | Salomaki | |
| 2003/0084150 A1 | 5/2003 | Hansen et al. | |
| 2003/0093789 A1 | 5/2003 | Zimmerman et al. | |
| 2003/0097397 A1 | 5/2003 | Giannetti | |
| 2003/0097410 A1 | 5/2003 | Atkins et al. | |
| 2003/0106022 A1 | 6/2003 | Goodacre | |
| 2003/0119540 A1 | 6/2003 | Mathis | |
| 2003/0120734 A1 | 6/2003 | Kagan et al. | |
| 2003/0131073 A1 | 7/2003 | Lucovsky et al. | |
| 2003/0135569 A1 | 7/2003 | Khakoo et al. | |
| 2003/0144894 A1 | 7/2003 | Robertson et al. | |
| 2003/0154293 A1 | 8/2003 | Zmolek | |
| 2003/0177175 A1 | 9/2003 | Worley et al. | |
| 2003/0182428 A1 | 9/2003 | Li et al. | |
| 2003/0200268 A1 | 10/2003 | Morris | |
| 2003/0211845 A1 | 11/2003 | Lhotia et al. | |
| 2003/0217098 A1 | 11/2003 | Bobde et al. | |
| 2003/0217099 A1 | 11/2003 | Bobde et al. | |
| 2003/0217109 A1 | 11/2003 | Ordille et al. | |
| 2003/0225840 A1 | 12/2003 | Glassco et al. | |
| 2003/0229674 A1 | 12/2003 | Cabrera et al. | |
| 2003/0233537 A1 | 12/2003 | Wohlgemuth et al. | |
| 2003/0236086 A1 | 12/2003 | Litwin | |
| 2003/0236830 A1 | 12/2003 | Ortiz et al. | |
| 2003/0236831 A1 | 12/2003 | Ortiz et al. | |
| 2003/0236832 A1 | 12/2003 | McIntyre et al. | |
| 2003/0236856 A1 | 12/2003 | Bird et al. | |
| 2004/0002932 A1 | 1/2004 | Horovitz et al. | |
| 2004/0002967 A1 | 1/2004 | Rosenblum et al. | |
| 2004/0002988 A1 | 1/2004 | Seshadri et al. | |
| 2004/0003042 A1 | 1/2004 | Horvitz et al. | |
| 2004/0003084 A1 | 1/2004 | Malik et al. | |
| 2004/0003090 A1 | 1/2004 | Deeds | |
| 2004/0003104 A1 | 1/2004 | Boskovic et al. | |
| 2004/0014013 A1 | 1/2004 | Diesel et al. | |
| 2004/0015553 A1 | 1/2004 | Griffin et al. | |
| 2004/0015569 A1 | 1/2004 | Lonnfors | |
| 2004/0031058 A1 | 2/2004 | Reisman | |
| 2004/0034848 A1 | 2/2004 | Moore et al. | |
| 2004/0037271 A1 | 2/2004 | Liscano et al. | |
| 2004/0054887 A1 | 3/2004 | Paulsen, Jr. et al. | |
| 2004/0059781 A1 | 3/2004 | Yoakum et al. | |
| 2004/0059791 A1 | 3/2004 | Sherman et al. | |
| 2004/0064821 A1 | 4/2004 | Rousselle | |
| 2004/0092250 A1 | 5/2004 | Valloppillil | |
| 2004/0098491 A1 | 5/2004 | Costa-Requena et al. | |
| 2004/0109197 A1 | 6/2004 | Gardaz et al. | |
| 2004/0116119 A1 | 6/2004 | Lewis et al. | |
| 2004/0117458 A1 | 6/2004 | Tominaga | |
| 2004/0122896 A1 | 6/2004 | Gourraud | |
| 2004/0125941 A1 | 7/2004 | Yoakum | |
| 2004/0128181 A1 | 7/2004 | Zurko | |
| 2004/0128353 A1 | 7/2004 | Goodman et al. | |
| 2004/0129901 A1 | 7/2004 | Yamaguchi et al. | |
| 2004/0133640 A1 | 7/2004 | Yeager et al. | |
| 2004/0133641 A1 | 7/2004 | McKinnon et al. | |
| 2004/0145603 A1 | 7/2004 | Soares | |
| 2004/0153506 A1 | 8/2004 | Ito et al. | |
| 2004/0158608 A1 | 8/2004 | Friedman et al. | |
| 2004/0161080 A1 | 8/2004 | Digate et al. | |

(56) References Cited

U.S. PATENT DOCUMENTS

| | | |
|---|---|---|
| 2004/0162881 A1 | 8/2004 | Digate et al. |
| 2004/0172455 A1 | 9/2004 | Green et al. |
| 2004/0177116 A1 | 9/2004 | McConn et al. |
| 2004/0177134 A1 | 9/2004 | Lonnfors et al. |
| 2004/0179039 A1 | 9/2004 | Blattner et al. |
| 2004/0179232 A1 | 9/2004 | Inukai et al. |
| 2004/0183829 A1 | 9/2004 | Kontny et al. |
| 2004/0187133 A1 | 9/2004 | Weisshaar et al. |
| 2004/0193488 A1 | 9/2004 | Khoo et al. |
| 2004/0201668 A1 | 10/2004 | Matsubara et al. |
| 2004/0205124 A1 | 10/2004 | Limprecht et al. |
| 2004/0205134 A1 | 10/2004 | Digate et al. |
| 2004/0205142 A1 | 10/2004 | Bahr |
| 2004/0210829 A1 | 10/2004 | Christofari et al. |
| 2004/0215723 A1 | 10/2004 | Chadha |
| 2004/0215732 A1 | 10/2004 | McKee et al. |
| 2004/0216036 A1 | 10/2004 | Chu et al. |
| 2004/0225717 A1 | 11/2004 | Cuervo |
| 2004/0230661 A1 | 11/2004 | Rashid et al. |
| 2004/0230667 A1 | 11/2004 | Wookey |
| 2004/0243941 A1 | 12/2004 | Fish |
| 2004/0250283 A1 | 12/2004 | Duigenan et al. |
| 2004/0254985 A1 | 12/2004 | Horstemeyer |
| 2004/0267887 A1 | 12/2004 | Berger et al. |
| 2005/0004984 A1 | 1/2005 | Simpson |
| 2005/0004985 A1 | 1/2005 | Stochosky |
| 2005/0004995 A1 | 1/2005 | Stochosky |
| 2005/0010637 A1 | 1/2005 | Dempski et al. |
| 2005/0021624 A1 | 1/2005 | Herf et al. |
| 2005/0021626 A1 | 1/2005 | Prajapat et al. |
| 2005/0021645 A1 | 1/2005 | Kulkarni et al. |
| 2005/0027805 A1 | 2/2005 | Aoki |
| 2005/0030939 A1 | 2/2005 | Roy et al. |
| 2005/0039134 A1 | 2/2005 | Wiggeshoff et al. |
| 2005/0044143 A1 | 2/2005 | Zimmermann et al. |
| 2005/0044144 A1 | 2/2005 | Malik et al. |
| 2005/0044242 A1 | 2/2005 | Stevens et al. |
| 2005/0048961 A1 | 3/2005 | Ribaudo et al. |
| 2005/0055405 A1 | 3/2005 | Kaminsky et al. |
| 2005/0055412 A1 | 3/2005 | Kaminsky et al. |
| 2005/0071426 A1 | 3/2005 | Shah |
| 2005/0071428 A1 | 3/2005 | Khakoo et al. |
| 2005/0071433 A1 | 3/2005 | Shah |
| 2005/0071776 A1 | 3/2005 | Mansfield et al. |
| 2005/0080848 A1 | 4/2005 | Shah |
| 2005/0086300 A1 | 4/2005 | Yeager et al. |
| 2005/0086309 A1 | 4/2005 | Galli et al. |
| 2005/0096928 A1 | 5/2005 | Ruggaber et al. |
| 2005/0097470 A1 | 5/2005 | Dias et al. |
| 2005/0102362 A1 | 5/2005 | Price et al. |
| 2005/0102366 A1 | 5/2005 | Kirsch |
| 2005/0108347 A1 | 5/2005 | Lybeck et al. |
| 2005/0108387 A1 | 5/2005 | Li et al. |
| 2005/0119012 A1 | 6/2005 | Merheb et al. |
| 2005/0119913 A1 | 6/2005 | Hornreich et al. |
| 2005/0125496 A1 | 6/2005 | Thuerk |
| 2005/0131778 A1 | 6/2005 | Bennett et al. |
| 2005/0132004 A1 | 6/2005 | Horovitz et al. |
| 2005/0132005 A1 | 6/2005 | Horovitz et al. |
| 2005/0132006 A1 | 6/2005 | Horovitz et al. |
| 2005/0132016 A1 | 6/2005 | Boone |
| 2005/0135240 A1 | 6/2005 | Ozugur |
| 2005/0165658 A1 | 7/2005 | Hayes et al. |
| 2005/0188039 A1 | 8/2005 | Charters et al. |
| 2005/0190744 A1 | 9/2005 | Sun et al. |
| 2005/0197995 A1 | 9/2005 | Badt, Jr. et al. |
| 2005/0213609 A1 | 9/2005 | Brusilovsky et al. |
| 2005/0267896 A1 | 12/2005 | Goodman et al. |
| 2005/0273499 A1 | 12/2005 | Goodman et al. |
| 2005/0278637 A1 | 12/2005 | Youm et al. |
| 2005/0280860 A1 | 12/2005 | Ito et al. |
| 2006/0004911 A1 | 1/2006 | Becker et al. |
| 2006/0004921 A1 | 1/2006 | Suess et al. |
| 2006/0014546 A1 | 1/2006 | Bodin et al. |
| 2006/0030264 A1 | 2/2006 | Morris |
| 2006/0036712 A1 | 2/2006 | Morris |
| 2006/0087992 A1 | 4/2006 | Ganesh |
| 2006/0088014 A1 | 4/2006 | Ganesh |
| 2006/0135182 A1 | 6/2006 | Unmehopa |
| 2006/0190117 A1 | 8/2006 | Weczorek et al. |
| 2006/0224688 A1 | 10/2006 | Morris |
| 2006/0248185 A1 | 11/2006 | Morris |
| 2006/0280166 A1 | 12/2006 | Morris |
| 2007/0005725 A1 | 1/2007 | Morris |
| 2007/0100836 A1* | 5/2007 | Eichstaedt et al. ............... 707/10 |
| 2007/0112856 A1 | 5/2007 | Schram et al. |
| 2007/0150441 A1 | 6/2007 | Morris |
| 2007/0150814 A1 | 6/2007 | Morris |
| 2007/0162360 A1 | 7/2007 | Congram et al. |
| 2007/0288580 A1 | 12/2007 | Kaminsky et al. |
| 2008/0046510 A1 | 2/2008 | Beauchamp et al. |
| 2008/0046556 A1 | 2/2008 | Nicholls et al. |
| 2008/0049734 A1 | 2/2008 | Zhakov et al. |
| 2008/0242231 A1 | 10/2008 | Gray |
| 2008/0294772 A1 | 11/2008 | Hagale et al. |

OTHER PUBLICATIONS

JP 2005-010874 (Shiga) Jan. 13, 2005 (abstract) (online) Retrieved from the PAJ database.

Capra, et al., "Exploiting Reflection in Mobile Computing Middleware," in : ACM Sigmobile, Mobile Computing and Communications Review, vol. 6, Issue 4, pp. 34-44, Oct. 2002 [retrieved on Oct. 6, 2007] Retrieved from the Internet: <URL: http://www.lancs.ac.uk/postgrad/gracep/capra.pdf>.

Microsoft Computer Dictionary, Published May 1, 2002, Microsoft Press, Fifth Edition.

"PubSub Sidebar Adds Real-Time Monitoring of Weblogs and Newsgroups to Popular Firefox Web Browser," [online] PR Newswire Association, LLC, Oct. 26, 2004 [retrieved on Nov. 25, 2008] Retrieved from the Ineternet: <URL: http://www.accessmylibrary.com/coms2/summary_0286-14134912_ITM>, 2 pages.

Rosenberg, J., "A Data Model for Presence," [online] Feb. 2005 [retrieved on May 6, 2005]; Retrieved from the Internet:<URL:http//www.softarmor.com/wgdb/docs/draft-ietf-simple-presence-data-model02.txt>, 28 pages.

"An Exploration of Dynamic Documents," [online] 1999 [retrieved on Mar. 3, 2006]; Retrieved from the Internet: <URL:http//www.wp.netscape.com/assist/net_sites/pushpull.html>, 4 pages.

Chen, G., et al., "Context Aggregation and Dissemination in Ubiquitous Computing Systems," [online] Dartmouth College, Feb. 28, 2002, Retrieved from the Internet: <URL: http://www.cs.dartmouth.edu/~solar/>, 10 pages.

Day, M., "'HTTP Envy' and Presence Information Protocols," [online] Sep. 1998 [retrieved on May 10, 2005]; Retrieved from the Internet:<URL:http//www.watersprings.org/pub/id/draft-day-envy-00.txt>, 4 pages.

Eatmon, R., et al., "JEP-0004: Data Forms," [online] Jan. 5, 2006 [retrieved on Feb. 16, 2006]; Retrieved from the Internet: <URL:http//www.jabber.org/jeps/jep-0004.html>, 15 pages.

Millard, P., et al., "JEP-0060: Publish-Subscribe," [online] Mar. 3, 2005 [retrieved on Feb. 16, 2006]; Retrieved from the Internet: <URL:http//www.jabber.org/jeps/jep-0060.html>, 60 pages.

Saint-Andre, P., "JEP-0119: Extended Presence Protocol Suite," [online] Jabber Software Foundation, Mar. 28, 2005 [retrieved on Aug. 4, 2005]; Retrieved from the Internet: <URL:http//www.jabber.org/jeps/jep-0124.html>, 8 pages.

Smith, D., et al., "JEP-0124: HTTP Binding," [online] Mar. 2005 [retrieved on May 10, 2005]; Retrieved from the Internet: <URL:http//www.jabber.org/jeps/jep-0124.html>, 22 pages.

KnowNow LiveBrowser [online] KnowNow, Inc., Aug. 13, 2004 [retrieved on Jun. 17, 2005] Retrieved from the Internet: <URL:http//www.knownow.com/products/browser/>, 1 page.

Robinson, S., et al., "Multipurpose Internet Mail Extensions Within Jabber-XML," [online] Jabber Software Foundation, Aug. 1999, Retrieved from the Internet: <URL: http://www.jabber.org/old-core/MIME.html>, 2 pages.

Lonnfors, M., et al., "Partial Publication of Presence Information," [online] Feb. 6, 2004 [retrieved Jan. 6, 2006]; Retrieved from the

(56) References Cited

OTHER PUBLICATIONS

Internet: <URL:http//www.ietf.org/internet-drafts/draft-lonnfors-simple-partial-publish-00.txt>, 10 pages.
Bhatia, S., et al., "PHP: Hypertext Preprocessor for SIP," [online] Jul. 2001 [retrieved on Jul. 27, 2005]; Retrieved from the Internet: <URL:http//www.ietf.org/draft-bhatia-sipping-sip-php-00.txt>, 5 pages.
Liscano, R., Presence and Awareness Services: (FIW 2003 Jun. 11, 2003), University of Ottawa, School for Information Technology and Engineering, Jun. 11, 2003, 89 pages.
Østhus, E. C., et al., "Presence and Call Screening in VoIP," [online] Norwegian University of Science and Technology, Nov. 2004 [retrieved on Jul. 28, 2005]; Retrieved from the Internet: <URL:http//www.item.ntnu.no/~lillk/stud-proj/osthus-Prosjekt_h04.pdf>, 101 pages.
Sugano, H., et al., "Presence Information Data Format (PIDF)," [online] The Internet Society, May 2003 [retrieved on Aug. 4, 2005]; Retrieved from the Internet: <URL:http://www.ietf.org/proceedings/04aug/I-D/draft-ietf-impp-cpim-pidf-08.txt>, 23 pages.
Boman, K., "Presence Security Architecture" (3GPP SA3 Meeting #25, SA3-020569), Ericsson / 3rd Generation Partnership Project, Nov. 2002, 11 pages.
Presence Service; Security, Release 6 (3GPP TS 33.141 v. 6.1.0), Association of Radio industries and Business (ARIB) / 3rd Generation Partnership Project, Sep. 2004, 13 pages.
Minson, R., et al., "Push/Pull-Processing for Adaptive Interest Management in Distributed Simulations and DVEs," [online] Jul. 14, 2004, Retrieved from the Internet: <URL: www.cs.bham.ac.uk/~rzm/research/papers/push_pull_short.ps>, 12 pages.
Fielding, R., et al., RFC 2616, "Hypertext Transfer Protocol—HTTP/1.1," [online] The Internet Society, Jun. 1999 [retrieved on May 6, 2005]; Retrieved from the Internet: <URL:ftp//ftp.isi.edu/in-notes/rfc2616.txt>, 145 pages.
Nielsen, H., et al., RFC 2774, "An HTTP Extension Framework" [online] The Internet Society, Feb. 2000 [retrieved on May 6, 2005];Retrieved from the Internet: <URL:ftp//ftp.isi.edu/in-notes/rFc2774.txt>, 17 pages.
Day, M., et al., RFC 2778, "A Model for Presence and instant Messaging" [online] The Internet Society, Feb. 2000 [retrieved on May 6, 2005]; Retrieved from the Internet: <URL:http://www.ietf.org/rfc/rfc2778.txt?number=2778>, 14 pages.
Day, M., et al., RFC 2779, "Instant Messaging / Presence Protocol Requirements" [online] The Internet Society, Feb. 2000 [retrieved on May 6, 2005];Retrieved from the Internet: <URL:http://www.ietf.org/rfc/rfc2779.txt>, 22 pages.
Lennox, J., RFC 3050, "Common Gateway Interface for SIP," [online] The Internet Society, Jan. 2001 [retrieved on Jul. 28, 2005]; Retrieved from the Internet: <URL:http://www.ietf.org/rfc/rfc3050.txt> 35 pages.
Rosenberg, J., et al., RFC 3261, "SIP: Session Initiation Protocol," [online] The Internet Society, Jun. 2002 [retrieved on Aug. 4, 2005]; Retrieved from the Internet: <URL:http://www.ietf.org/rfc/rfc3261.txt>, 221 pages.
Peterson, J., RFC 3859, "Common Profile for Presence (CPP)" [online] The Internet Society, Aug. 2004 [retrieved on May 6, 2005] Retrieved from the Internet: <URL:http://www.ietf.org/rfc/rfc3859.txt>, 13 pages.
Peterson, J., RFC 3860, "Common Profile for Instant Messaging (CPIM)" [online] The Internet Society, Aug. 2004 [retrieved on May 7, 2005] Retrieved from the Internet: <URL:http://www.ietf.org/rfc/rfc3860.txt>, 9 pages.
Sugano, H., et al., RFC 3863, "Presence Information Data Format" [online] The Internet Society, Aug. 2004 [retrieved on May 6, 2005]; Retrieved from the Internet: <URL:http://.ietf.org/rfc/rfc3863.txt>, 24 pages.
P. Saint-Andre, E., RFC 3920, "Extensible Messaging and Presence Protocol (XMPP):Core" [online] The Internet Society, Oct. 2004 [retrieved on Jun. 6, 2005]; Retrieved from the Internet: <URL:http://ietf.org/rfc/rfc3920.txt>, 75 pages.
P. Saint-Andre, E., RFC 3921, "Extensible Messaging and Presence Protocol (XMPP):Instant Messaging and Presence" [online] The Internet Society, Oct. 2004 [retrieved on Jun. 6, 2005]; Retrieved from the Internet: <URL:http://.ietf.org/rfc/rfc3921.txt>, 89 pages.
Osborne, R., et al., "RVP: A Presence and Instant Messaging Protocol" [online] Microsoft, Aug. 2000 [retrieved on May 10, 2005]; Retrieved from the Internet: <URL:http://msdn.microsoft.com/library/default.asp?url=library/en-us/dnmes2k/html/rvp.asp>, 19 pages.
Ramsdell, J.D., "Simple Instant Messaging and Presence Protocol Version 2.5" [online] The MITRE Corporation, Sep. 28, 2004 [retrieved on May 10, 2005]; Retrieved from the Internet: <URL:http://simp.mitre.org/download/simp.html>, 22 pages.
Neilsen, H. F. (Microsoft) and Ruellan, H. (Canon), Ed., "SOAP 1.2 Attachment Feature," [online] W3C, MIT, ERCIM, Keio, Jun. 8, 2004 [retrieved on Aug. 4, 2005]; Retrieved from the Internet: <URL:http://www.w3.org/TR/2003/REC-soap12-part0-20030624/>, 13 pages.
Mitra, N. (Ericsson), Ed., "SOAP Version 1.2 Part 0: Primer," [online] W3C, MIT, ERCIM, Keio, Jun. 24, 2003 [retrieved on Aug. 4, 2005]; Retrieved from the Internet: <URL:http://www.w3.org/TR/2004/NOTE-soap12-af-20040608/>, 47 pages.
Universal Mobile Telecommunications System (UMTS), Presence Service; Stage 1, Release 6, (3GPP TS 22.141 v. 6.3.0), European Telecommunications Standards Institute (ETSI) / 3rd Generation Partnership Project, Jan. 2005, 26 pages.
Mohr, G., "WhoDP: Widely Hosted Object Data Protocol," [online] Mar. 2, 1998 [retrieved Jan. 6, 2006]; Retrieved from the Internet: <URL:http//www.watersprings.org/pub/id/draft-mohr-whodp-00.txt>, 29 pages.

\* cited by examiner

METHOD AND SYSTEM FOR PROVIDING DATA HANDLING INFORMATION FOR USE BY A PUBLISH/SUBSCRIBE CLIENT

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

BACKGROUND

More and more, users of electronic devices are exchanging digital information asynchronously in substantially real time over the Internet using asynchronous communication protocols. Unlike traditional communication protocols, such as HyperText Transport Protocol (HTTP), the commands of an asynchronous protocol, such as publish/subscribe (pub/sub) communication protocols, are structured such that there need not be a one-to-one correspondence between requests and responses exchanged between the devices. In some cases a sender of information via the protocol need not wait, nor expect a response from, a receiver. Moreover, a receiver need not have sent a request corresponding to each received response. That is, a receiver may receive multiple responses to a single request and/or may receive an unsolicited message from a device. Thus, unlike HTTP where the reply is sent directly (synchronously) and only in response to the entity's request, the information can instead be sent in response to the sender's posting of the information (i.e., asynchronous to the request of information).

According to pub/sub communication protocols, an entity, referred to as a subscriber or subscriber client, is allowed to subscribe to information provided by another entity, referred to as a publisher, via a pub/sub service. Publishers publish to a distinct ID, typically a uniform resource identifier (URI) or uniform resource locator URL (URL), and subscribers subscribe by providing the ID. The publisher posts, i.e., publishes, the information to the pub/sub service identifying the tuple to be created or updated, the service then transmits the published tuple information to all interested parties, i.e., subscribers, via notification messages. The published information can be read simultaneously by any number of subscribers. So long as the subscriber remains subscribed to the information, the subscriber will continue to receive notification messages corresponding to the publisher's postings.

Notably, as is used herein, the term "publish/subscribe" refers to the class of services and associated protocols where a subscriber receives only the most recently published information in a notification message resulting from a subscription. That is, the pub/sub service transmits to the subscriber only the most current state of the published information, and does not queue, or store, previously published data for retrieval when the subscriber is offline or otherwise unsubscribed, such as with email and traditional message queues. Thus, unlike typical message queuing services, when a subscriber logs on or subscribes to the pub/sub service, the subscriber receives only the current state of the information, as well as subsequent updates to the information while the subscriber is subscribed. The subscriber does not receive previous updates that may have occurred while the subscriber was offline or unsubscribed. In addition, the pub/sub services as described herein are not topic based subscription services where typically any number of publishers may contribute to a single subscription. In topic based subscription services, whether a published entity is sent to a subscriber is based on its topic or categorization. Such topic based subscription services are also sometimes referred to as pub/sub services.

Typically, when the subscriber receives a notification message that includes the published information from the pub/sub service, the information is displayed to the subscriber in a certain manner or otherwise handled by a software client on the subscriber's device. Thus, while the information to be handled is dynamic, the manner in which the information is displayed or handled is generally pre-defined and static.

To address this shortcoming, one approach suggests creating a template in response to receiving a subscription request. Nevertheless, this approach merely creates a static template at the pub/sub service. This template cannot be updated dynamically and therefore suffers the same disadvantages. In another approach, processing policies for rendering and for making other data handling decisions are stored at the pub/sub service and implemented at the pub/sub service. Nevertheless, as before, the policies are static and cannot be dynamically fine tuned by a publisher or by a subscriber.

In another approach, rules and attributes associated with user-defined status levels are provided and stored in a single data tuple so that the notification message to the subscriber includes the rules and attributes as well as the user-defined status level. This approach can be extended to placing data handling information in the data tuple along with the published information so that the subscriber can receive both the data handling information and the published information. Nevertheless, this introduces many disadvantages. For instance, because the data handling information can be voluminous compared to just the updated data, the notification messages can be bulky and therefore consume resources. This can be especially problematic for handheld client devices that have limited bandwidth. Moreover, the one-to-one relationship between the data handling information and the data tuple is inefficient when the same data handling information can be used for many data tuples or when many different data handling information sets can be combined and used for one data tuple. In short, each of the approaches above fails to describe a flexible and dynamic way to provide data handling information for use by a pub/sub client to handle data published by the pub/sub service.

SUMMARY

Accordingly, a system and method for providing data handling information for use by a client of a pub/sub service to handle data published by the pub/sub service are described. According to an exemplary embodiment, a method includes receiving a subscription request to a data tuple that includes source data from a client of the pub/sub service. When the request is received, a first subscription is provided for the client to the data tuple and a second subscription, distinct from the first subscription, is automatically provided for the client to a data handling tuple that is associated with the data tuple and that includes data handling information defining how the source data of the data tuple is to be handled by the client. A first notification message including the source data is generated and a second notification message, distinct from the first notification message, is generated that includes the data handling information.

According to another exemplary embodiment, a system is described for providing data handling information for use by a client of a pub/sub service to handle data published by the pub/sub service. The system includes a data store for storing a plurality of data tuples, each of which include source data, and a plurality of data handling tuples, each of which include data handling information defining how source data of an associated data tuple is to be handled by a client of the publish/subscribe service. The system also includes a tuple association handler component configured for managing an association between a data tuple of the plurality of data tuples and at least one of the plurality of data handling tuples, and a subscription handler component for receiving, from a client of the pub/sub service, a subscription request to a data tuple, and configured for providing, in response to the request, a first subscription for the client to the data tuple and for automatically providing a second subscription for the client to a data handling tuple that is associated with the data tuple, where the first subscription is distinct from the second subscription. The system also includes a notification handler component configured for generating, pursuant to the first subscription, a first notification message including the source data and for generating, pursuant to the second subscription, a second notification message including the data handling information, where the first and second notification messages are distinct from one another.

In another exemplary embodiment, a method for handling data from a pub/sub service by a client of the pub/sub service includes sending a subscription request to a pub/sub service to subscribe to a data tuple that includes source data and that is managed by the pub/sub service. In response to the request, a first notification message that includes the source data is received from the pub/sub service pursuant to the subscription to the data tuple. Moreover, a second notification message that includes data handling information defining how the source data of the data tuple is to be handled is received pursuant to a subscription to a data handling tuple that is associated with the data tuple and that includes the data handling information. The data handling information is then used to process the source data.

According to another exemplary embodiment, a system is described for handling data from a pub/sub service by a client of the pub/sub service and includes a watcher component configured for sending a subscription request to a pub/sub service to subscribe to a data tuple including source data managed by the pub/sub service. The system also includes a source data manager component configured for receiving, pursuant to the subscription to the data tuple, and for processing a first notification message including the source data from the publish/subscribe service, a data handling information manager component configured for receiving and processing a second notification message including data handling information defining how the source data of the data tuple is to be handled, where the second notification message is received pursuant to a subscription to a data handling tuple that includes the data handling information, and a data handler component configured for using the data handling information to process the source data.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Figure 1:
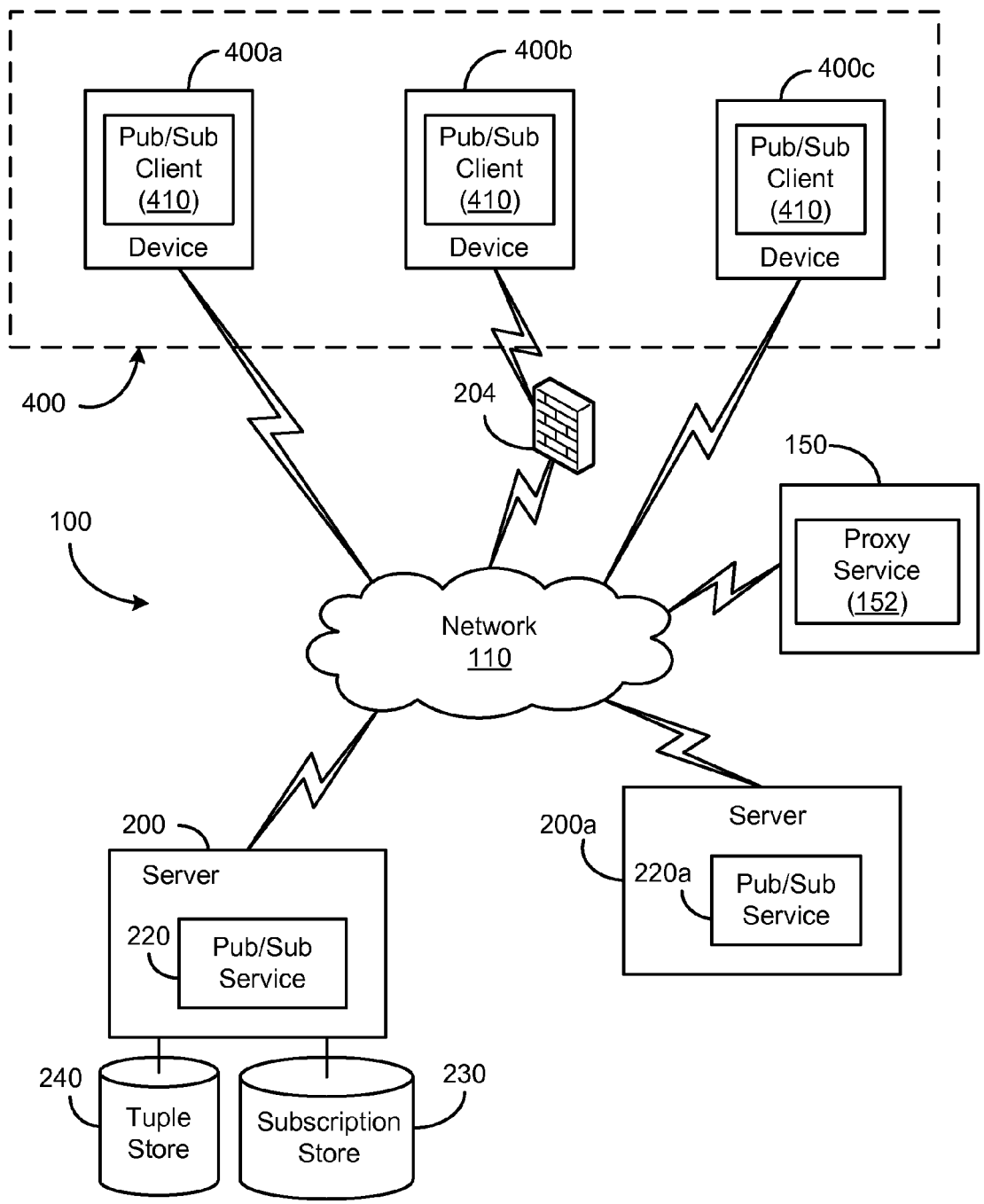
FIG. 1 is a block diagram illustrating an exemplary system according to an exemplary embodiment.

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

According to an exemplary embodiment, a method and system for providing data handling information for use by a client of a pub/sub service to handle data published by the pub/sub service is described. A pub/sub communication architecture and its underlying messaging protocol allow published information to be sent to a subscriber as it is received, in many instances, substantially in real-time in relation to the publication of the information. Information is published within the pub/sub communication architecture using a publish command. The published information can then be communicated to a subscriber using a notify command. The notify command can either include the published information or can provide a reference to the published information.

Well known pub/sub communication protocols include presence protocols, such as Extensible Messaging and Presence Protocol: Instant Messaging (XMPP-IM), Session Initiation Protocol (SIP) for Instant Messaging and Presence Leveraging (SIMPLE), and rendezvous protocol (RVP), which are used by presence services, and Jabber Software Foundation's pub/sub protocol as specified in Jabber Enhancement Proposal (JEP) JEP0060: Publish-Subscribe. The architecture, models, and protocols associated with presence services in general are described in "Request for Comments" (or RFC) documents RFC 2778 to Day et al., titled "A Model for Presence and Instant Messaging" (February 2000), RFC 2779 to Day et al., titled "Instant Messaging/Presence Protocol" (February 2000), and RFC 3921 to Saint-Andre et. al, titled "Extensible Messaging and Presence Protocol (XMPP): Instant Messaging and Presence", each of which are published and owned by the Internet Society and incorporated here in their entirety by reference.

Generally speaking, one or more pub/sub servers are used to provide pub/sub services. The function of a pub/sub server, however, can be incorporated, either in whole or in part, into other entities. For example, according to the presence service model described in RFC 2778, two distinct agents of a pub/sub, e.g., presence, service client are defined. The first of these agents, called a "presentity" (combining the terms "presence" and "entity"), provides information to be stored and distributed throughout the pub/sub service on behalf of a pub/sub client. The second type of presence agent is referred to as a "watcher". Watchers receive published information from a pub/sub (presence) service on behalf of a pub/sub (presence) client.

The presence model of RFC 2778 describes two types of watchers, referred to as "subscribers" and "fetchers". A subscriber requests notification from the presence service of a change in some presentity client's presence information. The presence service establishes a subscription on behalf of the subscriber to a presentity client's presence information, such that future changes in the presentity client's presence information are "pushed" to the subscriber. In contrast, the fetcher class of watchers requests (or fetches) the current value of some presentity client's presence information from the presence service. As such, the presence information can be said to be "pulled" from the presence service to the watcher.

Users of the presence service are referred to in the presence model described in RFC 2778 as principals. Typically, a principal is a person or group that exists outside of the presence model, but can also represent software or other services capable of interacting with the presence service. A principal can interact with the presence system through a presence user agent (PUA) or a watcher user agent (WUA). As in the case of the presentity and watcher clients with which these service clients interact, the presence and watcher user agents can be combined functionally as a single user agent having both the characteristics of the presence and watcher user agents. User agents can be implemented such that their functionality exists within a presence service, external to a presence service, or a combination of both. Similar statements can be made about presentities and watchers.

By way of example, aspects of an exemplary embodiment described here can employ a presence protocol as the pub/sub communication protocol. It should be understood, however, the relevant techniques described here can be performed using any pub/sub communications protocol as defined herein. Additionally, the exemplary embodiment described herein is not limited to the use of a pub/sub protocol for all communications described. Other known protocols, e.g., Hypertext Transfer Protocol (HTTP), can also be used.

According to pub/sub communication protocols, the pub/sub service stores and organizes information provided by the publisher and by the subscriber in data entities referred to as tuples. A tuple, in its broadest sense, is a data object containing one or more elements. For example, a presence service manages presence tuples, each of which contain a status element that stores presence information relating to the principal associated with the presence tuple. Tuples can include other elements that can store other published information associated with the principal. The published information may include general contact information of the publisher, such as name, telephone number, email address, postal address, an IP address or URLs associated with the publisher, and the like, as well as other data or content. As used here, the tuple can also be a representation that maps field names to certain values to indicate that an entity or object (e.g., the principal) includes certain components, information, and/or perhaps has certain properties.

As stated above, a client of a pub/sub service can subscribe to a tuple and receive information published to that tuple pursuant to the subscription. The client typically handles the information received from the pub/sub service in a fixed manner according to the client's data handling instructions. Thus, while the information received can be dynamic and from more than one source, the data handling instructions are static.

According to an exemplary embodiment, data handling information can be stored in a data handling tuple and managed by a pub/sub service. The data handling tuple can be associated with one or more data tuples, each of which includes source data. In one embodiment, the data handling tuple includes information defining how the source data of the associated data tuple is to be handled by a client that receives the source data. In one embodiment, when a client subscribes to a data tuple, a subscription to the associated data handling tuple can also be provided automatically such that the client receives both the source data of the data tuple and the data handling information of the data handling tuple. In an exemplary embodiment, the client is configured to use the data handling information to process the source data.

By storing data handling information in data handling tuples, flexible relationships can be established between data tuples and data handling tuples. For example, one data tuple can be associated with several data handling tuples, several data tuples can be associated with one data handling tuple, or several data tuples can be associated with several data handling tuples. In addition, the data handling information in a data handling tuple can easily be updated by a client and the updated handling information can be distributed to all current subscribers via the pub/sub service. Thus, the handling instructions can be dynamic and easily distributed.

FIG. 1 is a block diagram illustrating an exemplary system according to one embodiment. The system 100 includes a plurality of client devices 400 in communication with a server 200 that hosts a pub/sub service 220. Example types of such devices include a camera phone, a personal digital assistant (PDA), a personal computer (PC), a network-enabled camera, and the like. Each device 400 includes at least one pub/sub client 410, such as a subscriber client, that is configured to communicate with the pub/sub service 220 using a pub/sub communication protocol. In one embodiment, the subscriber client 410 can be a subscription browser, as disclosed in co-pending U.S. patent application Ser. No. 11/160,612 entitled "METHOD AND APPARATUS FOR BROWSING NETWORK RESOURCES USING AN ASYNCHRONOUS COMMUNICATIONS PROTOCOL," filed on Jun. 30, 2005, and commonly owned with the present application and herein incorporated by reference.

In one embodiment, the client devices 400 are configured to communicate with each other and with at least one the pub/sub server 200, 200*a* via a network 110, such as the Internet. As is shown, a proxy service 152 hosted by a server 150 serves as a proxy among the devices 400 in the network 110. The proxy service 152 permits the devices 400 and the pub/sub service(s) 220, 200*a* to communicate with one another through a firewall 204 in a known manner. In one embodiment, the proxy service 152 can be associated with the pub/sub service 220, 220*a*, and/or associated with at least one of the client devices 400. While shown residing in a separate server 150, the proxy service 152 can also reside in the pub/sub server 200, 200*a*. In addition, while only one proxy service 152 is shown in FIG. 1, a plurality of proxies 152 can be implemented to handle network access to and from client devices 400 that are protected by one or more firewalls 204.

As is shown, the pub/sub server, e.g., 200, hosts the pub/sub service 220. The pub/sub service 220 is configured to process subscriptions by pub/sub clients 410 to information published by other pub/sub clients 410. In an exemplary embodiment, tuple data and subscription information can be stored in a tuple data store 240 and a subscription data store, 230 respectively. The data stores 230, 240 can include files, in memory caches, and databases, for example. In one embodiment, all data can be treated as tuple data meaning that it can be formatted for transfer using a data format compatible with the pub/sub communication protocol supported by the pub/ sub service 220. While the tuple data store 240 is shown separate from the subscription data store 230, the tuple data and the subscription information can also be stored in a single data store. Moreover, although the data stores 230, 240 are depicted as having a particular location remote from the devices 400, nothing prevents them from being stored in another location. For example, all or a portion of the information may be stored in a memory structure (not shown) on the devices 400 or on another memory structure (not shown).

Figure 2:
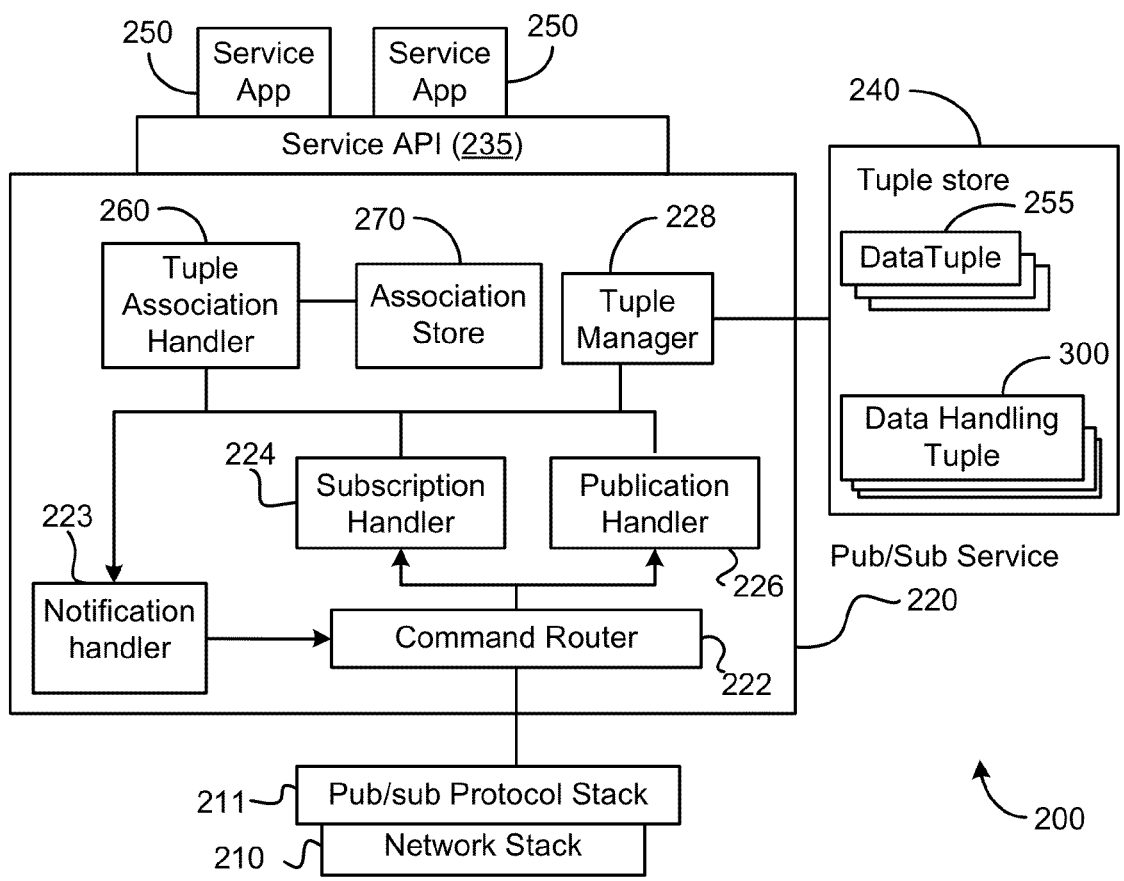
FIG. 2 is a block diagram illustrating an exemplary pub/sub server according to one exemplary embodiment.

FIG. 2 is a block diagram of an exemplary pub/sub server 200 according to one embodiment. The server 200 includes a pub/sub protocol stack component 211 coupled to a network stack component 210. The network stack component 210 is used to exchange information received or transmitted at the physical layer (e.g., the wire, air interface, or fiber optic cable) of the network 110, through the data link (e.g., ETHERNET, 802.11 WIFI), transport/network (e.g., TCP/IP) and application (e.g., XMPP) layers of the stack. The pub/sub protocol stack component 211 processes pub/sub commands received from the network 110 and passes the commands to the pub/sub service 220.

The pub/sub service 220 includes a command router 222 configured to receive and process pub/sub commands from the pub/sub protocol stack component 211. In one embodiment, the command router 222 directs subscribe commands to a subscription handler 224 that is configured to handle subscribe commands, directs publish commands to a publication handler 226 that is configured to handle publish commands, and sends notify commands on behalf of a notification handler 223. The command router 222 can also be configured to process other pub/sub commands, such as PROBE and FETCH/POLL.

The subscription handler 224 processes subscribe commands and other tasks associated with subscriptions. In one embodiment, the subscription handler 224 processes a subscribe command by placing a subscribing client 410 on a subscription list associated with the tuple. In addition, the subscription handler 224 authenticates and authorizes the client 410, manages rosters and subscription lists, and uses the notification handler 223 to construct notification response messages informing clients 410 when new information is available. The publication handler 226 processes publish commands and coordinates with the subscription handler 224 the publication of tuple data to ensure that subscribing clients 410, if any, are notified via the notification handler 223.

In one embodiment, the pub/sub service 220 is configured to host one or more service applications 250 via a service application programming interface (API) 235. Such a configuration is described in co-pending U.S. patent application Ser. No. 11/323,762 entitled "METHOD AND APPARATUS FOR PROVIDING CUSTOMIZED SUBSCRIPTION DATA," filed on Dec. 30, 2005, and commonly owned with the present application and herein incorporated by reference. In one embodiment, the service API 235 enables the pub/sub service 220 to pass subscription notification messages to any one of the service applications 250. Because the service API 235 is independent of both the transport and pub/sub protocol, messages can be exchanged freely and securely between the pub/sub service 220 and any of the service applications 250.

The pub/sub service 220 also includes a tuple manager 228 for managing data tuples 255, data handling tuples 300, and published information in the tuples 255, 300. In one embodiment, the tuple manager 228 can be configured also to manage rosters for security purposes and to store and to retrieve tuple data from the tuple store 240. If the pub/sub service 220 archives published information, the tuple manager 228 can also be configured to archive and to retrieve the archived published information.

In an exemplary embodiment, the pub/sub service 220 includes means for providing a data handling tuple 300 that includes data handling information that defines how source data of a data tuple 255 is to be handled by a client 410 that receives the source data. For example, the publication handler 226 described above can be configured to perform this task.

Figure 3:
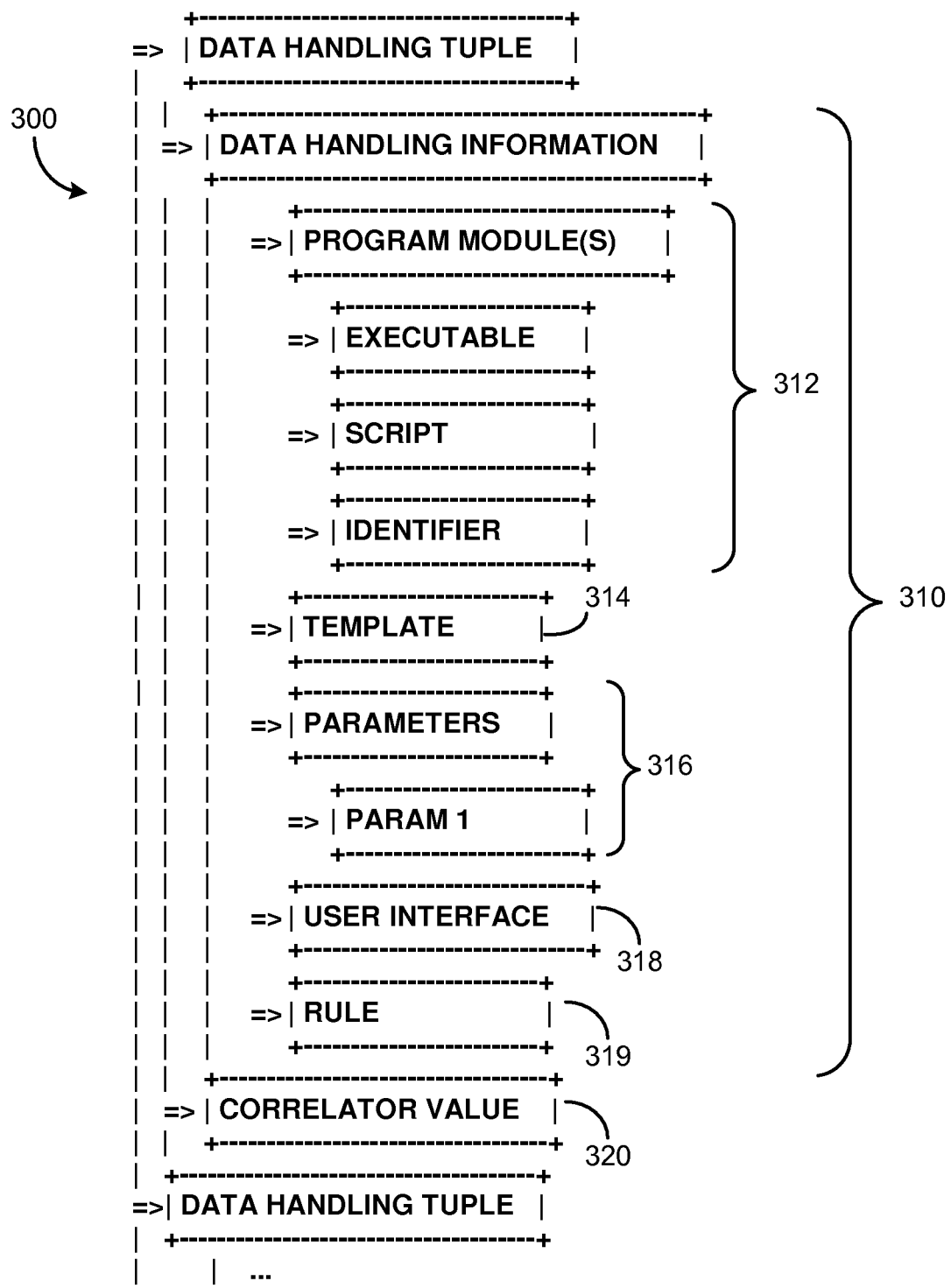
FIG. 3 is an exemplary data format of a data handling tuple according to one embodiment.

FIG. 3 illustrates an exemplary data model of a data handling tuple 300 according to one embodiment. The data handling tuple 300 can include a data handling information element 310 and a correlation value element 320. According to an exemplary embodiment, a client 410 can publish data handling information to the data handling information element 310 using a pub/sub communication protocol.

In one embodiment, the data handling information can include display actions, which can be simple or complex, and can vary according to the client device 400 associated with the client 410. For example, display actions can instruct the receiving client 410 to:

display the temperature when the application is minimized;
cycle through the DOW, NASDAQ, and S&P 500 when the application is minimized; and
pop the display window to the top window when a weather, traffic, stock or other important alert is received.

Other examples of data handling information can relate to the storage of the source data on the client device 400, accessing additional information or services to complete the processing, suppressing an action on the data, rules for processing the data, or any other action that is triggered by the receipt of an updated data tuple 255.

According to an exemplary embodiment, the data handling information element 310 can include a program module element 312 that can store at least one of an executable program block, a script, and an identifier of a program module executable. In one embodiment, the identifier can be a uniform resource identifier (URI) or locator (URL) that can be used to retrieve the program module executable. In another embodiment, the data handling information element 310 can also include at least one of a template element 314 for storing a template, a parameters element 316 for storing customization parameters and a rule element 319 for storing a rule.

According to one exemplary embodiment, the client 410 can be a generic pub/sub client 410 that is configured to support any type of data so that new data types can be provided without necessarily modifying the client 410. In this embodiment, the data handling information element 310 can include a user interface element 318 that stores instructions defining a user interface or a reference to such instructions. In this embodiment, a user interface for a generic pub/sub client can be defined using user interface markup languages, which are often based on Extensible Markup Language (XML). Examples of XML-based user interface markup languages include XUL (the XML User Interface Language) and XAML (Extensible Application Markup Language). The pub/sub client 410 can replace variables in the user interface definition with the updated or current source data values of the data tuple 255.

For example, parsed, general XML entities could be used in the user interface markup that reference parsed general entities using an ampersand (&) and semicolon (;) as delimiters. Thus, if the user interface markup requires the current temperature in Fahrenheit, it could refer to the temperature as &tempFahrenheit; and the corresponding source data value received in the most recent data tuple 255 can replace the referenced entity. In one embodiment, the data tuple 255 can be formatted so that a file Document Type Definition (DTD) can easily be created and the data substitution can take place automatically, using an XML processor, but other techniques are equally acceptable. For example, if the user interface markup uses a script, then properties files created from the received data tuple 255 can be used in addition to or instead of parsed entities.

According to an exemplary embodiment, the correlation value element 320 can store a correlation value. In one embodiment, the correlation value can be used to associate the data handling tuple 300 with one or more data tuples 255 that share the same correlation value.

The data handling tuple 300 shown in FIG. 3 and described above is an exemplary data model. Those skilled in the art would readily recognize that the data handling tuple 300 can, and most likely would, include additional elements and/or sub-tuples. For example, the data handling tuple 300 can include a status element and contact information, as well as other information. Accordingly, the description above should not be interpreted as limiting the structure of the data handling tuple 300.

Referring again to FIG. 2, according to an exemplary embodiment, the pub/sub service 220 includes means for managing associations between data tuples 255 and data handing tuples 300. For example, the pub/sub service 220 can include a tuple association handler component 260 to perform this function. In one embodiment, the tuple association handler component 260 is configured to update and manage association information between a given data tuple 255 and at least one data handling tuple 300. The association information can be stored in an association store 270 which is accessible by the tuple association handler component 260. In an exemplary embodiment, associations between data tuples 255 and data handling tuples 300 can be flexible in that a plurality of data tuples 255 can be associated with a single data handling tuple 300, a single data tuple 255 can be associated with a plurality of data handling tuples 300, or a single data tuple 255 can be associated with a single data handling tuple 300.

In one embodiment, the tuple association handler component 260 can determine which, if any, data handling tuples 300 are associated with a given data tuple 255 when the subscription handler 224 receives a new subscription to the data tuple 255. If a data handling tuple 300 is determined, the tuple association handler component 260 can retrieve and provide information relating to the data handling tuple 300 so that a subscription to the data handling tuple 300 can be provided.

In one embodiment, the pub/sub service 220 includes means for receiving a subscription request from a pub/sub client 410 to a data tuple 255 that includes source data, means for providing, in response to the request, a first subscription for the client 410 to the data tuple 255, and means for automatically providing a second subscription for the client 410 to a data handling tuple 300 that is associated with the data tuple 255. In one embodiment, the subscription handler 224, described above, can be configured to perform these functions.

In addition, the pub/sub service 220 includes means for generating a first notification message including source data pursuant to a subscription to a data tuple 255, and means for generating a second notification message that includes the data handling information pursuant to a subscription to a data handling tuple. For example, the notification handler 223, described above, can be configured to generate the first and second notification messages. Moreover, the notification handler 223 can be configured to send via the command router 222 the first and second notification messages to a pub/sub client 410 that subscribes to the data tuple 255 and which is automatically subscribed to the data handling tuple 300.

Figure 4:
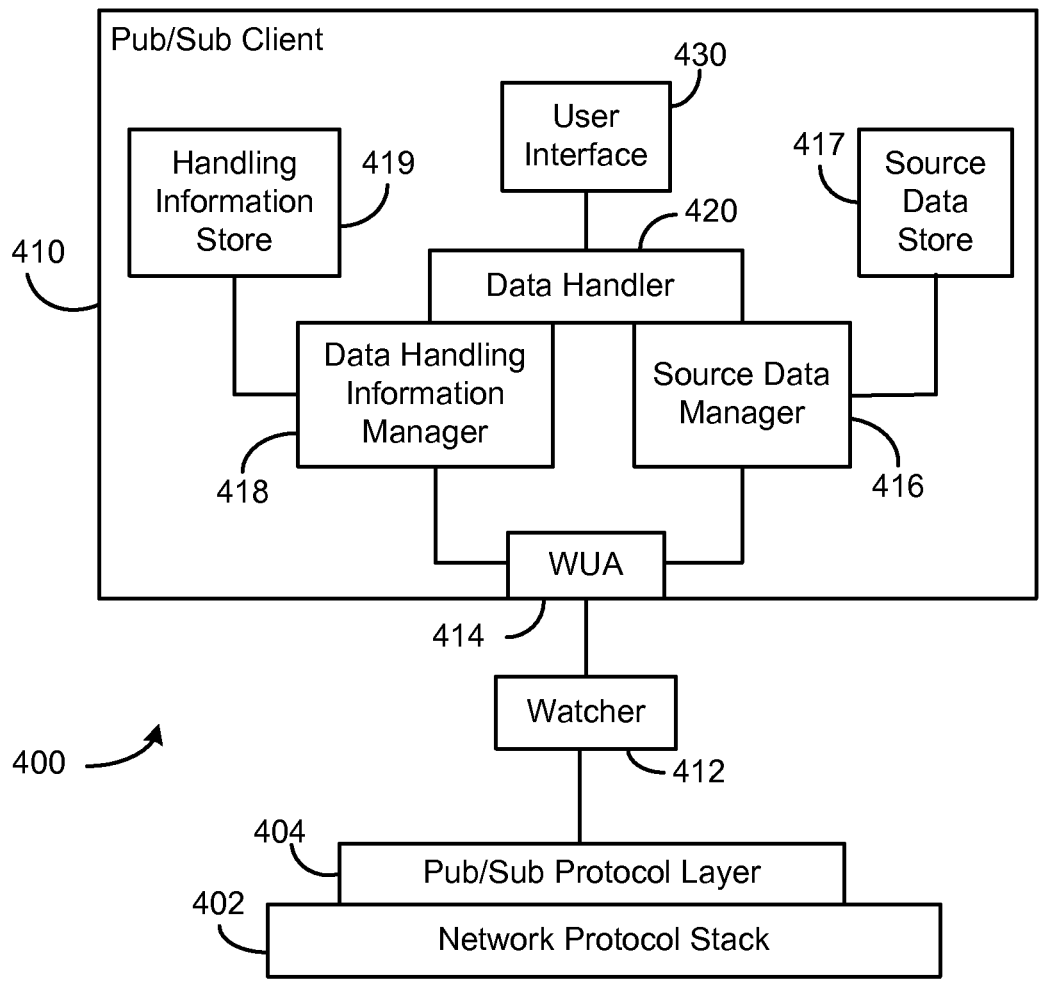
FIG. 4 is a block diagram illustrating an exemplary pub/sub client device according to one exemplary embodiment.

FIG. 4 is a block diagram illustrating an exemplary client device 400 according to one embodiment. The client device 400 includes the pub/sub client 410 that is configured to communicate with the pub/sub service 220 using a pub/sub communication protocol. In one embodiment, the pub/sub client 410 can send and receive information to and from the pub/sub server 200 via a pub/sub protocol layer 404 and a network stack component 402. The network stack component 402 is used to exchange information received or transmitted at the physical layer of the network 110, through the data link, transport/network and application layers of the stack. The pub/sub protocol layer 404 processes messages received from the pub/sub server 200 over the network 110.

The client device 400 includes a watcher component 412 and a watcher user agent ("WUA") 414 associated with the pub/sub client 410. In one embodiment, the watcher component 412 translates requests between the pub/sub server 200 and the WUA 414, that is, it translates between the pub/sub communication protocol of the server 200 and the data format used by the WUA 414 (typically proprietary). The watcher component 412 serves watching/subscribing clients 410 by sending, for example, subscribe commands on behalf of the WUA 414 and by routing notification messages to the WUA 414.

The WUA 414 can be integrated into the client 410 (as shown) or external to the client 410. In one embodiment, the WUA 414 is configured to translate between a data format known to the watcher component 412 and WUA 414 and a data format known to the client 410. The WUA 414 also is configured to route messages between the client 410 and the watcher component 412. For example, the WUA 414 can send subscribe requests to the watcher component 412 on behalf of the client 410 and can pass notification messages received from the watcher component 412 to the client 410 for processing.

According to one embodiment, the pub/sub client 410 includes means for sending a subscription request to the pub/sub service 220 to subscribe to a data tuple 255 that includes source data and means for receiving and processing a notification message that includes the source data from the pub/sub service 220. For example, in one embodiment, the pub/sub client 410 can include a source data manager component 416 to perform these functions. The source data manager component 416 can store, update and retrieve the source data received pursuant to subscriptions to data tuples 255 in a source data store 417.

In an exemplary embodiment, the pub/sub client 410 also includes means for receiving and processing a notification message that includes data handling information, such as a data handling information manager component 418. In one embodiment, the data handling information manager component 418 can process the data handling information by downloading an executable program module or changing a font used to display text. The data handling information can be stored and retrieved in a handling information store 419.

In one embodiment, the pub/sub client 410 also includes means for using the data handling information to process source data corresponding to a data tuple 255 associated with the data handling information. For example, the pub/sub client 410 can include a data handler component 420 to perform this task. According to one embodiment, when updated source data is received, the data handler component 420 can handle, e.g., display on a user interface 430, the source data in accordance with the current data handling information. In another embodiment, when updated or new data handling information is received and processed, the data handler component 420 can update, i.e., refresh, how the current source data is being displayed. For example, when the client 410 is currently displaying weather data and a new skin is provided via new data handling information, the data handler component 420 can apply the new skin immediately to the current source data displayed. When, however, the source data has already been handled, for example by storing or forwarding, then the updated client data handling information can be applied to the next update to the source data.

Figure 5:
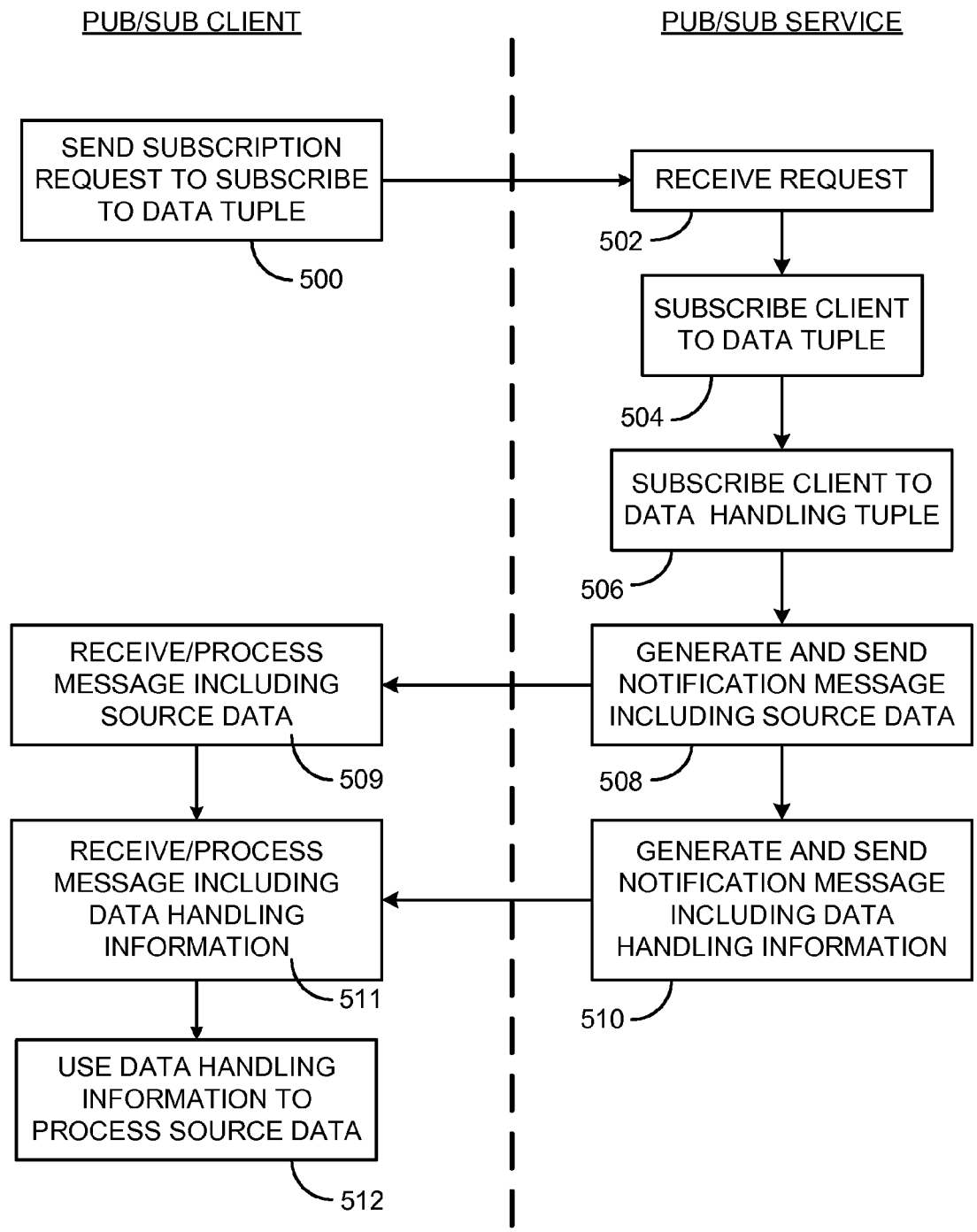
FIG. 5 a flow diagram illustrating a method for providing data handling information for use by a client of a pub/sub service to handle data published by the pub/sub service according to an exemplary embodiment.

FIG. 5 is a flow diagram illustrating a method for providing data handling information for use by a client 410 of a pub/sub service 220 to handle data published by the pub/sub service 220 according to an exemplary embodiment. Referring to FIGS. 1-5, the method begins when the pub/sub client 410 sends a subscription request to the pub/sub service 220 to subscribe to a data tuple 255 (block 500). As stated above, the data tuple 255 includes source data and is managed by the pub/sub service 220. In one embodiment, the subscription request can include an identifier that identifies the data tuple 255. In another embodiment, the subscription request can also include other information such as information relating to at least one of the client device 400 and its capabilities, an identifier of a user of the client 410, and preferences of the client 410. The source data manager component 416 generates the subscription request and uses the WUA 414 and watcher component 412 to transmit the request to the pub/sub service 220 via the pub/sub protocol layer 404 and network protocol stack 402 using a pub/sub communication protocol.

The pub/sub service 220 receives the subscription request to the data tuple 255 (block 502) and proceeds to process the request. For example, when the subscription request is received at the pub/sub service 220, it is routed by the command router 222 to the subscription handler 224. In response to the request, the subscription handler 224 provides a first subscription for the client 410 to the data tuple 255 identified in the request (block 504).

According to an exemplary embodiment, the subscription handler 224 also automatically provides a second subscription for the client 410 to a data handling tuple 300 that is associated with the data tuple 255 (block 506). As stated above, the data handling tuple 300 includes data handling information that defines how the source data of the data tuple 255 is to be handled by the client 410. In one embodiment, the first subscription to the data tuple 255 is distinct from the second subscription to the data handling tuple 300.

In one embodiment, the subscription handler 224 automatically provides the second subscription by invoking the tuple association handler component 260 and passing it the identifier associated with the data tuple 255. The tuple association handler component 260 can use the data tuple identifier to access the association store 270 and determine which, if any, data handling tuples 300 are associated with the data tuple 255. As stated above, the association store 270 includes association information between data tuples 255 and data handling tuples 300. In one embodiment, the data tuples 255 can include correlation values that indicate with which data handling tuples 300 each data tuple 255 is associated. Thus, the association between the data tuple 255 and the data handling tuple 300 can be based on shared correlation values.

In another embodiment, the subscription handler 224 can also pass to the tuple association handler component 260 information relating to the device capabilities of the subscribing client 410, a user identifier of the subscribing client 410, and/or preferences of the subscribing client 410 in addition to the data tuple identifier. In this embodiment, the subscription request from the subscribing client 410 can include such device specific, user specific and client specific information. Thus, when the data tuple 255 is associated with a plurality of data handling tuples 300, the tuple association handler component 260 can be configured to use this additional information as a filtering mechanism to select at least one of the plurality of associated data handling tuples 300. For example, when a user subscribes to weather data tuple from a particular handheld device 400, the tuple association handler component 260 can select an associated data handling tuple 300 that includes handling instructions optimized for that handheld device 400. When another user subscribes to the same weather data tuple 255 from a desktop computer 400, the tuple association handler component 260 can select a different data handling tuple 300 that includes handling instructions better suited to the desktop computer 400.

When the tuple association handler component 260 determines one or more data handling tuples 300 associated with the data tuple 255, it can pass this information back to the subscription handler 224. In another embodiment, the tuple association handler component 260 can be bypassed when the data tuple 255, itself, includes an element that contains a reference to one or more data handling tuples 300, or when the association is provided through a naming convention. In this case, the subscription handler 224 can determine the association without invoking the tuple association handler component 260, and then automatically subscribe the pub/sub client 410 to the associated data handling tuple(s) 300.

In one embodiment, the associated data handling tuple 300 and the data tuple 255 can be managed by the same pub/sub service 220. In another embodiment, the associated data handling tuple 300 can be managed by a different pub/sub service 220a than that managing the data tuple 255. In this embodiment, the subscription handler 224 can be configured to send, on behalf of the subscribing client 410, a subscription request for the data handling tuple 300 to the other pub/sub service 220a. The other pub/sub service 220a can then process the subscription request according to standard and known methods.

As stated above, the first subscription to the data tuple 255 is distinct from the second subscription to the data handling tuple 300. Thus, each subscription operates independently from the other. When either tuple 255 or 300 is updated, the pub/sub service 220 will send a notification message informing the subscribing client 410 of the newly published information. In one embodiment, the exception to this independence is when the subscribing client 410 cancels its subscription to the data tuple 255. Here, the subscription to the associated data handling tuple 300 can also be cancelled.

According to an exemplary embodiment, once the client 410 is subscribed to the data tuple 255 and to at least one data handling tuple 300, the notification handler 223 generates, pursuant to the first subscription to the data tuple 255, a first notification message that includes the source data (block 508) and generates, pursuant to the second subscription to the data handling tuple 300, a second notification message that includes the data handling information (block 510). In one embodiment, the first notification message can include the data tuple 255, and the second notification message can include the data handling tuple 300. Both notification messages are sent independently of one another and in no particular order to the subscribing client 410 by the command router 222 via the pub/sub protocol stack 211 and network stack 210 using the pub/sub protocol.

In one embodiment, an on-the-wire format for the data handling tuple 300 and the data tuple 255 can be based on the general purpose Jabber pub/sub protocol defined in XEP- 0060: Publish-Subscribe (http://www.xmpp.org/extensions/xep-0060.html). For instance, in Example 1, below, a notification message includes a data handling tuple 300 that provides parameters for displaying weather source data.

EXAMPLE 1

```
<message from='pubsub.exampleHandlerService.net'
  to='bob@example.com' id='foo'>
  <event xmlns='http://jabber.org/protocol/pubsub#event'>
    <items node='weather_data_handler'>
      <item id='0123456789'>
        <dataHandler
          xmlns='http://www.example.net/weatherHandlerParms'>
          <correlation>weather</correlation>
          <minimize>tempFahrenheit</minimize>
          <pop>severeWeatherAlert</pop>
          <skin>default</default>
        </dataHandler>
      </item>
    </items>
  </event>
</message>
```

The "dataHandler" element provides an example schema for the data handling tuple 300 where the namespace is "weatherHandlerParms," informing the subscribing client 410 that this data handling tuple 300 defines handling for weather source data. A correlation element is used by the subscribing client 410 to correlate the notification message including the source data with the associated notification message including the data handling information. Both messages can carry the same correlation value, e.g., "weather." The content of the minimize element is "tempFahrenheit," indicating to the subscribing client 410 that when the application is minimized the temperature source data should be displayed in the application icon. The content of the pop element is "severeWeatherAlert," indicating to the subscribing client 410 that if severe weather alert data is received, then a popup window should be created. The content of the skin element is "default," indicating to the subscribing client 410 that it should use the default skin for the application window.

In Example 2 below, a notification message includes a weather data tuple 255 to which the data handling tuple 300, in Example 1, would be applied.

EXAMPLE 2

```
<message from='pubsub.exampleDataService.net'
  to='bob@example.com' id='foo'>
  <event xmlns='http://jabber.org/protocol/pubsub#event'>
    <items node='weather_data'>
      <item id='0987654321'>
        <data xmlns='http://www.example.net/weatherData'>
          <correlation>weather</correlation>
          <usesDataHandler>yes</usesDataHandler>
          <weatherArea>Cary, NC</weatherArea>
          <tempFahrenheit>78</tempFahrenheit>
          < severeWeatherAlert >Severe thunderstorm warning until
          7:00 PM
          </severeWeatherAlert>
          <humidity>65</ humidity >
          <windMPH>15</windMPH>
        </data>
      </item>
    </items>
  </event>
</message>
```

The "usesDataHandler" element is used to inform the subscribing client 410 whether this data tuple 255 is associated with a data handling tuple 300. In this example, the value of "yes" indicates that it is, and that this source data should be processed by the subscribing client 410 in accordance with the data handling instructions contained in the associated data handling tuple 300. Note that the correlation element includes the value "weather," which matches the correlation value in the notification message in Example 1.

In an exemplary embodiment, the data tuple 255 and data handling tuple 300 are compatible with the subscribing client 410. The client 410 can be configured in multiple ways, e.g., it can be a specialized client that handles a fixed set of data types (e.g., weather and news), or it can be a generic client that handles any type of data. In one embodiment, a specialized client 410 can be written to handle a specific type of data, such as weather. The data tuple 255 to which the client 410 subscribes would contain weather information, such as temperature and wind speed, as shown in Example 2 above.

The behavior of the client 410 can be parameterized and the parameters can be provided in the data handling tuple 300, as shown in Example 1 above. Thus, for example, the client 410 would understand the "weatherArea" parameter in the data tuple 255 and display it in the correct place on the user interface 430 using the correct font, size and color, which could all be specified in the data handling information if desired by the application developer. In the above examples, the client 410 understands certain parameters that are provided in the data handling information.

Other techniques for providing the data handling information to the client 410, such as templates or executables, could also be used instead of, or in conjunction with, the use of parameters. For example, the data handling tuple 300 can include an executable program module, or a reference to such a module, that is to be downloaded and/or installed by the client 410. In another embodiment, the data handling tuple 300 can include multipart data of different formats. This can be accomplished by using Multipurpose Internet Mail Extension (MIME) formatting. Extensions to Jabber-XML to support MIME are described in the document to Robinson et al., titled "Multipurpose Internet Mail Extensions within Jabber-XML—A recommended practice specification for encoding MIME into the Jabber-XML protocol" (Core Jabber Group, 1999), accessible via the Internet at URL: "http://www.jabber.org/old-core/MIME.html" on Dec. 8, 2006.

In Example 3, below, a notification message includes a data handling tuple 300 that has a reference to data handling information, which the client 410 can then use to retrieve the data handling information. The data handling information, for example, can be an executable file that when retrieved and installed would update the data handling function of the client 410.

EXAMPLE 3

```
<message from='pubsub.exampleHandlerService.net'
  to='bob@example.com' id='foo'>
  <event xmlns='http://jabber.org/protocol/pubsub#event'>
    <items node='weather_data_handler'>
      <item id='0123456789'>
        <dataHandler
          xmlns='http://www.example.net/weatherHandlerExe'>
          <correlator>weather</correlator>
          <href>www.example.net/executables/weatherHandler</href>
        </dataHandler>
      </item>
```

```
    </items>
  </event>
</message>
```

Referring again to FIG. 5, once the first and second notification messages are sent to the subscribing client 410 (blocks 508, 510), the client 410 receives and processes the first notification message (block 509) and receives and process the second notification message (block 511). The order in which the first and second messages are received is arbitrary, i.e., the client 410 can receive the second notification message before the first notification message or vice versa.

In one embodiment, the client 410 receives the first or second notification message via the pub/sub protocol layer 404 and watcher component 412. The watcher component 412 routes the first or second notification message to the WUA 414, which determines whether the message includes the data tuple 255 (first notification message) or the data handling tuple 300 (second notification message). In one embodiment, when the WUA 414 detects that the message includes the data tuple 255, e.g., the message includes a "data" element, as opposed to a "dataHandler" element, the message is passed to the source data manager component 416 for processing. Otherwise, when the WUA 414 detects that the message includes the data handling tuple 300, e.g., it includes a "dataHandler" element, the message is passed to the data handling information manager component 418 for processing.

In one embodiment, when the data handling information manager component 418 receives the second notification message, it processes the data handling tuple 300 in accordance with the data handling techniques used by the data handling subscription and the correlation value. For example, in one embodiment, when the data handling tuple 300 includes data handling parameters for weather, the weather parameters in the client 410 are updated with the new values. Alternatively, or in addition, when the data handling tuple 300 includes a reference to an executable, then the data handling information manager component 418 can retrieve and install that executable. In another embodiment, the data handling information manager component 418 can also modify the data handling information to conform with the client's 410 preferences. When processing of the data handling tuple 300 is completed, the data handling information manager component 418 can record that the data handling information has been processed, and store the correlation value and the data handling information in the handling information store 419. Then, the correlation value and a completion indication are provided to the data handler component 420 for further processing.

In an exemplary embodiment, when the source data manager component 416 receives the first notification message, it determines whether the data tuple 255 is associated with a data handling tuple 300. For example, the source data manager component 416 can check for the presence of a "userDataHandler" element and, if there is one, whether its value is "yes." When such an element is not present or when the value is not "yes," then the notification message is treated in the standard manner. In one embodiment, the source data in the data tuple 255 can be handled using default handling instructions. Otherwise, when the value of the "userDataHandler" element is "yes," the notification message including the data tuple 255 is passed to the data handler component 420 for further processing.

When the data handler component 420 receives the data tuple 255 from the source data manager component 416, the data handler component 420 can determine whether the associated data handling tuple 300 has been received and processed based, for example, on the correlation value. When such is not the case, the data handler component 420 can store the source data in the source data store 417 until the associated data handling tuple 300 is processed. Alternatively, when the client 410 is so configured, the data handler component 420 can use default data handling information to handle the source data.

When the associated data handling tuple 300 has been received and processed, the data handler component 420 can use the data handling information in the associated data handling tuple 300 to process the source data (block 512). In one embodiment, when the source data is currently being handled pursuant to old data handling information, the data handler component 420 can refresh the handling, e.g., display, of the source data using the newly processed data handling information. For example, when the application is currently minimized and the newly processed data handling information indicates that the temperature in Fahrenheit is to be displayed when the application is minimized, then the data handler component 420 will display the temperature in Fahrenheit from the current data tuple 255 in an icon representing the minimized view of the application. In another embodiment, when the source data is not currently being handled, the data handler component 420 can retrieve the source data from the source data store 417 and use the data handling information to process the source data.

According to an exemplary embodiment, the subscribing client 410 can receive notification messages including updated source data and notification messages including updated data handling information independently from the pub/sub service 220 pursuant to the first and second subscriptions. In an exemplary embodiment, the notification messages can be processed in the manner described above. For example, when updated source data is received pursuant to the subscription to the data tuple 255, the client 410 can identify the data handing information associated with the source data using, for example, the correlation value, and use the identified data handling information to process the updated source data. Alternatively, when updated data handling information is received pursuant to the subscription to the data handling tuple 300, the client 410 can store the updated data handling information and then use it to process the associated source data.

In the embodiments described above, the data handling tuples 300 are provided by clients 410 other than the subscribing client 410. In another embodiment, the subscribing client 410 can be configured to create and maintain personalized data handling tuples 300 and to publish data handling information to the personalized data handling tuples at the pub/sub service 220. In this embodiment, the subscribing client 410 can specify in a subscription request to a data tuple 255 an association between the data tuple 255 and the personalized data handling tuple 300. In this embodiment, the subscription handler component 224 at the pub/sub service 220 can automatically subscribe the client 410 to the data tuple 255 and to the personalized data handling tuple 300 so that the second notification message includes the published data handling information.

Variations to the embodiments described above are also available. For example, in the described embodiments, the subscription handler 224 automatically provides the subscription to the data handling tuple 300 associated with the data tuple 255 without input from the client 410. In other words, the subscription to the data handling tuple 300 is transparent to the subscribing client 410. In another embodiment, the subscribing client 410 can participate in the process of subscribing to the data handling tuple 300. For example, in one embodiment, the subscription handler 224 can instruct the notification handler 223 to include in the first notification message the data tuple 255 as well as information relating to the associated data handling tuple 300. The source data manager component 416 can use the information relating to the data handling tuple 300 to subscribe to the data handling tuple 300 at a pub/sub service 220.

In another embodiment, the client 410 can use a naming convention to subscribe to the data tuple 255 and to the data handling tuple 300. For example, the subscription request for the data tuple 255 can include an identifier that is related to both the data tuple 255 and to the associated data handling tuple 300.

In yet another embodiment, the client 410 can be configured to invoke the tuple association handler component 260 directly, for example, via an out-of-band remote procedure call, and to retrieve the association information relating to the data tuple 255. In this embodiment, the client 410 can send information relating to the data tuple 255 to the tuple association handler component 260 and the tuple association handler component 260 can return information relating to the data handling tuple 300 associated with the data tuple 255. In another embodiment, the client 410 can establish a "one-time subscription" to perform this task. A discussion of one-time subscriptions may be found in the document to Chen et al., titled "Context Aggregation and Dissemination in Ubiquitous Computing Systems" (Dartmouth Computer Science Technical Report TR2002-420, 2002), available via the Internet at the URL: http://www.cs.dartmouth.edu/reports/TR2002-420.pdf on Dec. 8, 2006. In this embodiment, the pub/sub service 220 can respond with a notification including the association information and then automatically cancel the subscription. The client 410 can then use this information to subscribe to the data handling tuple 300.

Through aspects of the various embodiments, data handling information can be provided more efficiently and easily. Because the information is stored in separate and distinct data handling tuples 300, the associations between data tuples 255 and data handling tuples 300 can be complex and flexible. Subscriptions to the data tuples 255 and data handling tuples 300 are also separate and distinct. Accordingly, updates to the data handling information can be easily implemented and distributed to subscribing clients 410.

The executable instructions of a computer program for carrying out the methods illustrated in FIG. 5 can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

As used here, a "computer readable medium" can be any means that can contain, store, communicate, propagate, or transport the computer program for use by or in connection with the instruction execution machine, system, apparatus, or device. The computer readable medium can be, for example, but not limited to, an electronic, magnetic, optical, electromagnetic, infrared, or semiconductor machine, system, apparatus, device, or propagation medium.

More specific examples (a non-exhaustive list) of the computer readable medium can include the following: a wired network connection and associated transmission medium, such as an ETHERNET transmission system, a wireless network connection and associated transmission medium, such as an IEEE 802.11(a), (b), or (g) or a BLUETOOTH transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disc (CD), a portable digital video disc (DVD), and the like.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for providing data handling information for use by a client of a publish/subscribe service to handle data published by the publish/subscribe service, the method comprising:
   receiving, from a client of the publish/subscribe service, a subscription request to a data tuple that includes source data;
   providing, in response to the request, a first subscription for the client to the data tuple;
   automatically providing a second subscription for the client to a data handling tuple that is associated with the data tuple and that includes data handling information defining how the source data of the data tuple is to be handled by the client, wherein the first subscription is distinct from the second subscription and the data handling information includes at least one of a template, customization parameters, a program module executable, a rule, an identifier of a program module executable, a script, and instructions defining a user interface;
   generating, pursuant to the first subscription, a first notification message including the source data; and
   generating, pursuant to the second subscription, a second notification message including the data handling information, wherein the first and second notification messages are distinct from one another,
   wherein at least one of the preceding actions is performed on at least one electronic hardware component.

2. The method of claim 1 further comprising:
   providing a correlation value in the data handling tuple;
   providing the correlation value in the data tuple; and
   associating the data tuple with the data handling tuple via the correlation value.

3. The method of claim 2 wherein prior to providing the second subscription, the method further comprises:
   determining whether the data tuple is associated with at least one data handling tuple based on the correlation value.

4. The method of claim 1 wherein the data handling tuple is managed by another publish/subscribe service and wherein providing the second subscription includes:
   sending, on behalf of the client, a subscription request for the data handling tuple to the other publish/subscribe service that manages the data handling tuple.

5. The method of claim 1 wherein the subscription request to the data tuple further includes an identifier related to the data tuple and to the data handling tuple.

6. The method of claim 1 wherein automatically providing the second subscription includes providing information relating to the associated data handling tuple in the first notification message and receiving from the client another subscription request for the data handling tuple associated with the data tuple.

7. The method of claim 1 wherein automatically providing the second subscription includes providing information relating to the associated data handling tuple directly to the client pursuant to one of a one-time subscription and a remote procedure call and receiving from the client another subscription request for the data handling tuple associated with the data tuple.

8. A method for providing data handling information for use by a client of a publish/subscribe server to handle data published by the publish/subscribe service, the method comprising:
    receiving, from a client of the publish/subscribe service, a subscription request to a data tuple that includes source data;
    providing, in response to the request, a first subscription for the client to the data tuple;
    automatically providing a second subscription for the client to a data handling tuple that is associated with the data tuple and that includes data handling information defining how the source data of the data tuple is to be handled by the client, wherein the first subscription is distinct from the second subscription;
    generating, pursuant to the first subscription, a first notification message including the source data;
    generating, pursuant to the second subscription, a second notification message including the data handling information, wherein the first and second notification messages are distinct from one another; and
    sending the first and second notification messages to the client pursuant to the first and second subscriptions, respectively,
wherein at least one of the preceding actions is performed on at least one electronic hardware component.

9. A method for providing data handling information for use by a client of a publish/subscribe service to handle data published by the publish/subscribe service, the method comprising:
    receiving, from a client of the publish/subscribe service, a subscription request to a data tuple that includes source data;
    providing, in response to the request, a first subscription for the client to the data tuple;
    determining that the data tuple is associated with a plurality of data handling tuples; and
    selecting at least one of the plurality of associated data handling tuples based on at least one of device capabilities of a subscribing client, a user identifier of a subscribing client, and preferences of a subscribing client;
    automatically providing a second subscription for the client to a data handling tuple that is associated with the data tuple and that includes data handling information defining how the source data of the data tuple is to be handled by the client, wherein the first subscription is distinct from the second subscription;
    generating, pursuant to the first subscription, a first notification message including the source data; and
    generating, pursuant to the second subscription, a second notification message including the data handling information, wherein the first and second notification messages are distinct from one another,
wherein at least one of the preceding actions is performed on at least one electronic hardware component.

10. A method for providing data handling information for use by a client of a publish/subscribe service to handle data published by the publish/subscribe service, the method comprising:
    receiving, from a client of the publish/subscribe service, a subscription request to a data tuple that includes source data;
    providing, in response to the request, a first subscription for the client to the data tuple;
    automatically providing a second subscription for the client to a data handling tuple that is associated with the data tuple and that includes data handling information defining how the source data of the data tuple is to be handled by the client, wherein the first subscription is distinct from the second subscription;
    generating, pursuant to the first subscription, a first notification message including the source data; and
    generating, pursuant to the second subscription, a second notification message including the data handling information, wherein the first and second notification messages are distinct from one another,
    wherein the data tuple is associated with at least two data handling tuples and the method further comprises:
        automatically providing, in response to the subscription request to the data tuple, at least one other subscription for the client to at least one other data handling tuple that is associated with the data tuple; and
        generating at least one other notification message including the data handling information of the at least one other data handling tuple,
wherein at least one of the preceding actions is performed on at least one electronic hardware component.

11. A method for handling data from a publish/subscribe service by a client of the publish/subscribe service, the method comprising:
    sending a subscription request to a publish/subscribe service to subscribe to a data tuple including source data and managed by the publish/subscribe service;
    receiving, pursuant to the subscription to the data tuple, and processing a first notification message including the source data from the publish/subscribe service;
    receiving and processing a second notification message including data handling information defining how the source data of the data tuple is to be handled, wherein the data handling information includes at least one of a template, customization parameters, a program module executable, a rule, an identifier of a program module executable, a script, and instructions defining a user interface, and wherein the second notification message is received pursuant to a subscription to a data handling tuple that is associated with the data tuple and includes the data handling information; and
    using the data handling information to process the source data,
    wherein at least one of the proceeding actions is performed on at least one electronic hardware component.

12. The method of claim 11 wherein the data handling information includes an identifier of a program module executable and the method further includes using the identifier to retrieve the program module executable.

13. The method of claim 11 further comprising receiving at least one other notification message including data handling information of at least one other data handling tuple associated with the data tuple.

14. The method of claim 11 further comprising using one of a one-time subscription and a remote procedure call to retrieve information relating to the data handling tuple associated with the data tuple and using the information relating to the data handling tuple to subscribe to the data handling tuple prior to receiving the second notification message.

15. The method or claim 11 further comprising providing in the subscription request to the data tuple an identifier relating to the data tuple and to the data handling tuple.

16. The method of claim 11 further comprising:
receiving, pursuant to the subscription to the data tuple, updated source data from the publish/subscribe service;
identifying the data handling information associated with the source data; and
using the identified data handling information to process the updated source data.

17. The method of claim 11 further comprising:
receiving, pursuant to the subscription to the data handling tuple, updated data handling information;
storing the updated data handling information; and
using the updated data handling information to process source data associated with the data handling information.

18. The method of claim 11 further comprising modifying the data handling information to conform with the client's preferences.

19. The method of claim 11 further comprising:
publishing data handling information to a data handling tuple; and
specifying in the subscription request to the data tuple an association between the data tuple and the data handling tuple such that the second notification message includes the published data handling information.

20. A method for handling data from a publish/subscribe service by a client of the publish/subscribe service, the method comprising:
sending a subscription request to a publish/subscribe service to subscribe to a data tuple including source data and managed by the publish/subscribe service,
wherein sending the subscription request includes submitting information related to at least one of device capabilities of a subscribing client, a user identifier of a subscribing client, and preferences of a subscribing client;
receiving, pursuant to the subscription to the data tuple, and processing a first notification message including the source data from the publish/subscribe service;
receiving and processing a second notification message including data handling information defining how the source data of the data tuple is to be handled, wherein the second notification message is received pursuant to a subscription to a data handling tuple that is associated with the data tuple and includes the data handling information; and
using the data handling information to process the source data,
wherein at least one of the proceeding actions is performed on at least one electronic hardware component.

21. A method for handling data from a publish/subscribe service by a client of the publish/subscribe service, the method comprising:
sending a subscription request to a publish/subscribe service to subscribe to a data tuple including source data and managed by the publish/subscribe service;
receiving, pursuant to the subscription to the data tuple, and processing a first notification message including the source data from the publish/subscribe service;
receiving and processing a second notification message including data handling information defining how the source data of the data tuple is to be handled, wherein the second notification message is received pursuant to a subscription to a data handling tuple that is associated with the data tuple and includes the data handling information; and
using the data handling information to process the source data, wherein the first notification message includes information relating to the data handling tuple associated with the data tuple and the method further includes using the information relating to the data handling tuple to subscribe to the data handling tuple prior to receiving the second notification message, and wherein at least one of the proceeding actions is performed on at least one electronic hardware component.

22. The method of claim 21 wherein the data handling tuple is managed by a second publish/subscribe service and the method further comprises sending a subscription request to the second publish/subscribe service to subscribe to the data handling tuple.

23. A method for handling data from a publish/subscribe service by a client of the publish/subscribe service, the method comprising:
sending a subscription request to a publish/subscribe service to subscribe to a data tuple including source data and managed by the publish/subscribe service;
receiving, pursuant to the subscription to the data tuple, and processing a first notification message including the source data from the publish/subscribe service;
receiving and processing a second notification message including data handling information defining how the source data of the data tuple is to be handled, wherein the second notification message is received pursuant to a subscription to a data handling tuple that is associated with the data tuple and includes the data handling information,
wherein the subscription to the data handling tuple is provided automatically in response to the subscription to the data tuple; and
using the data handling information to process the source data,
wherein at least one of the proceeding actions is performed on at least one electronic hardware component.

* * * * *